Inventor
Herbert E. Twomley
By Lyon & Lyon attys

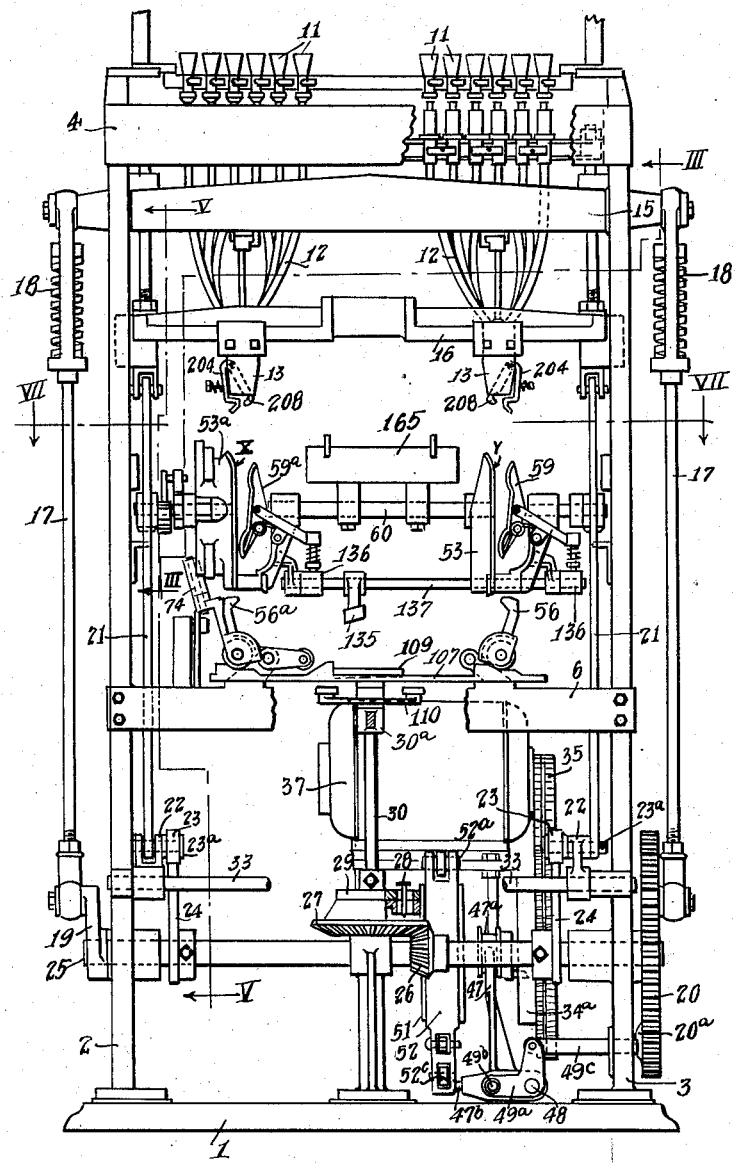

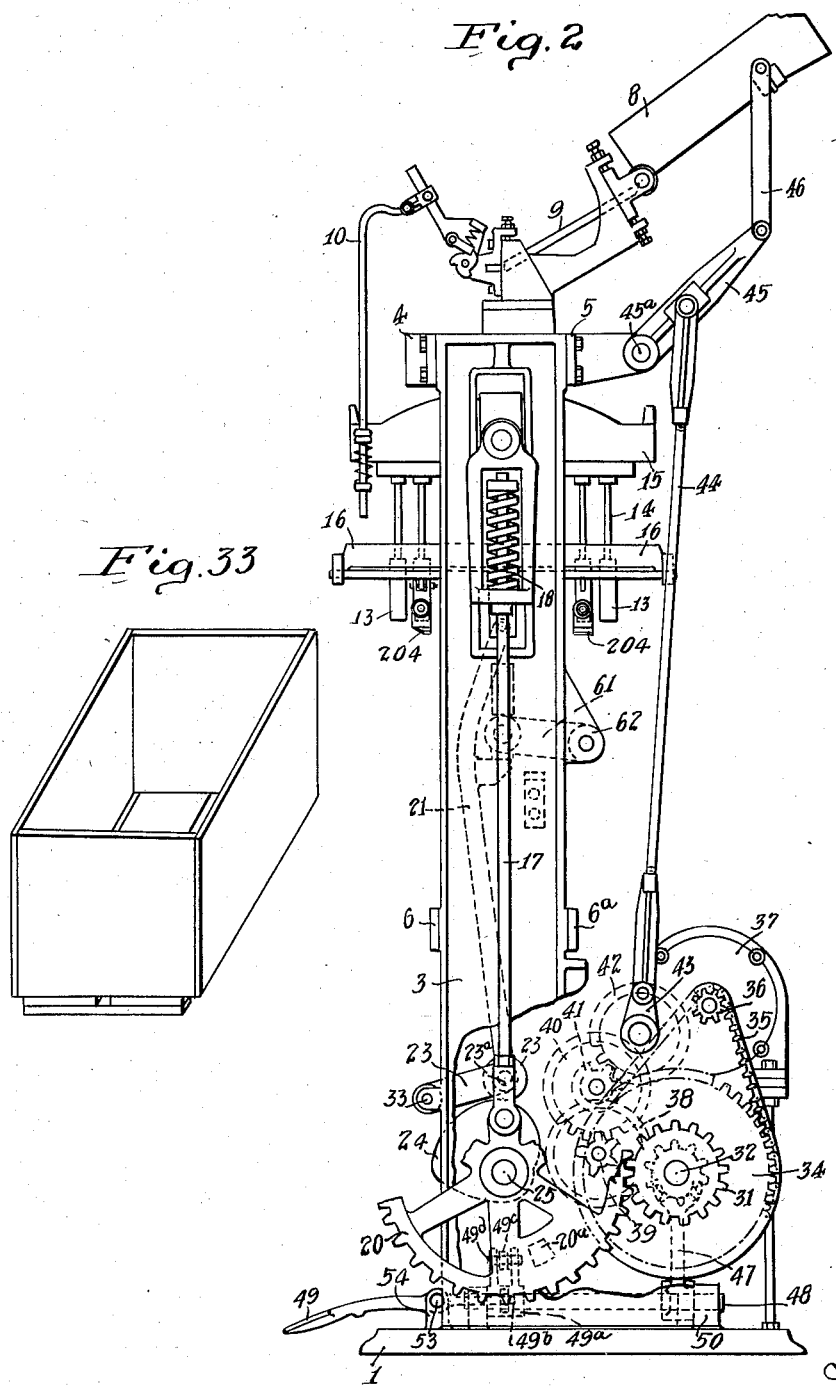

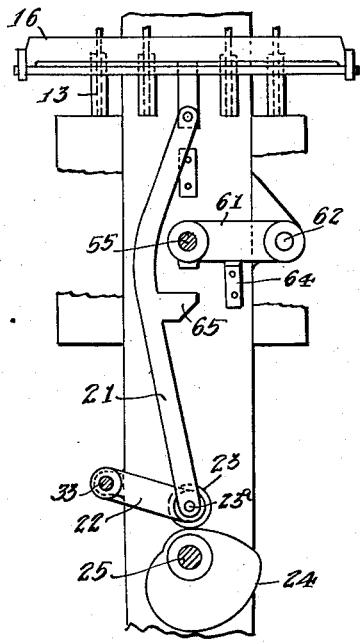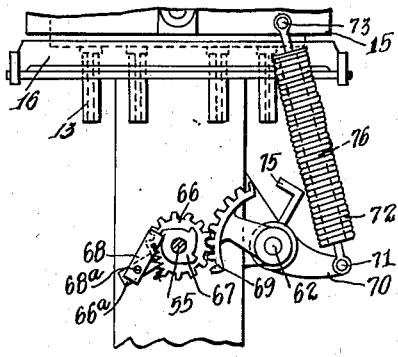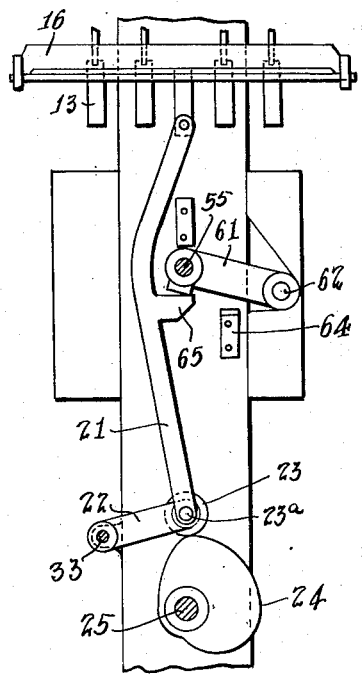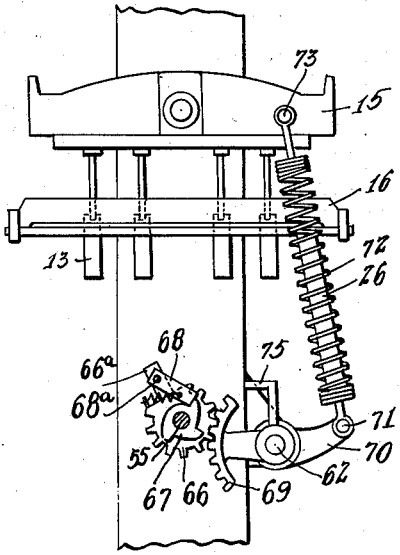

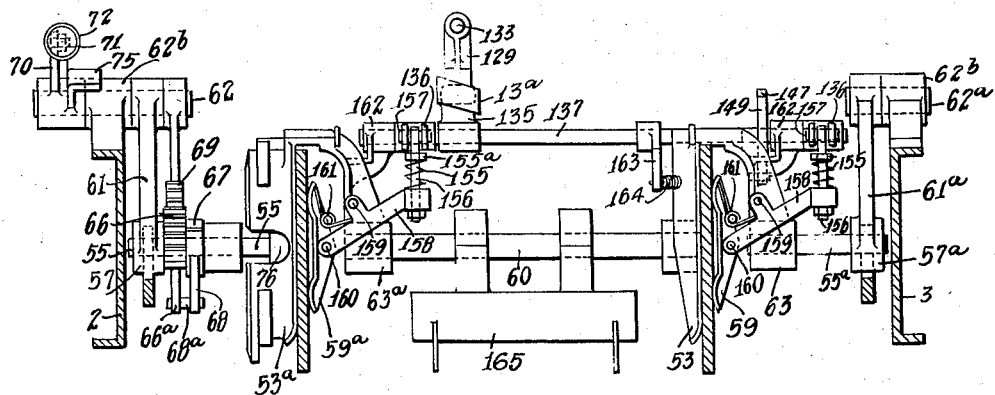

June 11, 1935.  H. E. TWOMLEY  2,004,355
BOX FRAMING MACHINE
Filed Nov. 15, 1933  12 Sheets-Sheet 8

Inventor
Herbert E. Twomley
By Lyon & Lyon attys

June 11, 1935.  H. E. TWOMLEY  2,004,355
BOX FRAMING MACHINE
Filed Nov. 15, 1933   12 Sheets-Sheet 11
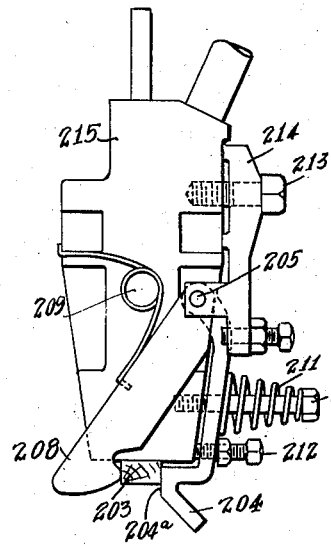
Fig. 24
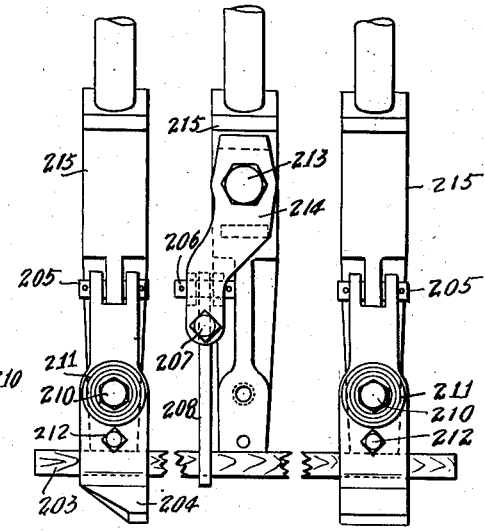
Fig. 26
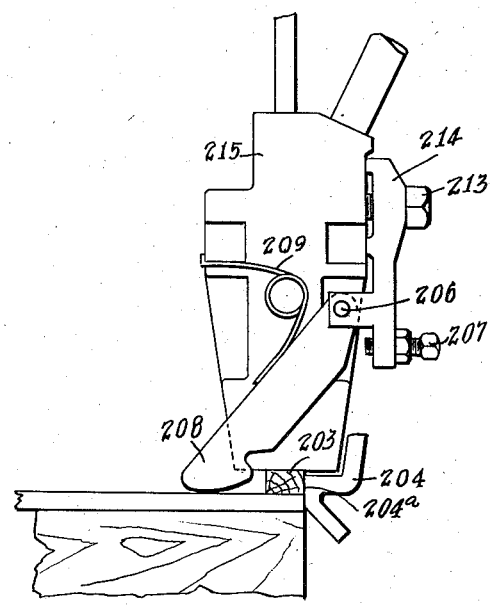
Fig. 25
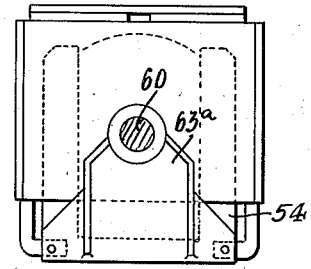
Fig. 31
Fig. 32
Inventor
Herbert E. Twomley
By Lyon & Lyon attys June 11, 1935. H. E. TWOMLEY 2,004,355
BOX FRAMING MACHINE
Filed Nov. 15, 1933 12 Sheets-Sheet 12
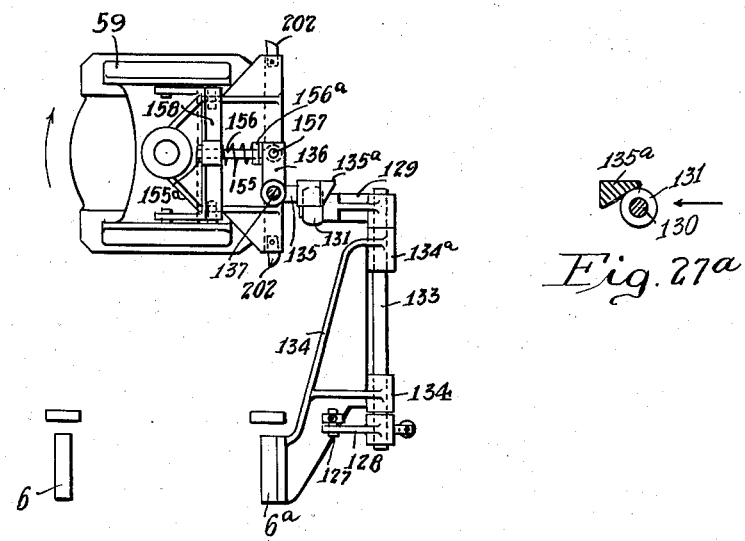
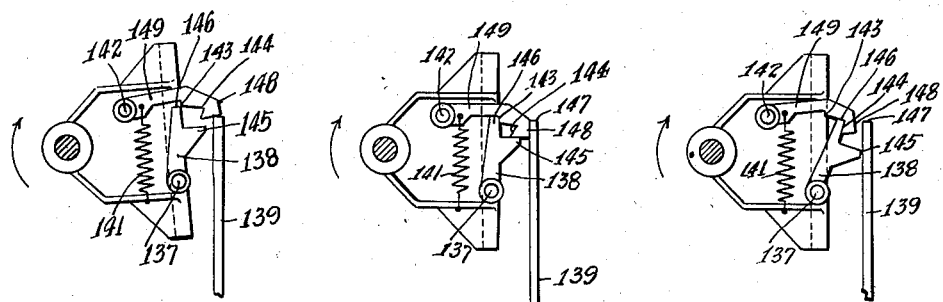
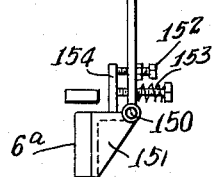
Inventor
Herbert E. Twomley
By Lyon & Lyon attys Patented June 11, 1935

2,004,355

UNITED STATES PATENT OFFICE 2,004,355

BOX FRAMING MACHINE

Herbert E. Twomley, Riverside, Calif., assignor to Donald Parker and Citizens National Trust and Savings Bank of Riverside, administrators of George D. Parker, deceased Application November 15, 1933, Serial No. 698,101

15 Claims. (Cl. 1—10)

This invention relates broadly to box nailing machines and more particularly to semi-automatic machines for nailing the side and bottom boards onto the end boards of boxes of the general dimensions employed for packing apples and pears, in which boxes the width is greater than the depth.

A broad object of the invention is to provide a semi-automatic machine in which the box parts are placed in and the completed box removed from the machine manually but in which the remaining operations are performed automatically under the control of the operator while the operator is reaching for and bringing box parts to the machine, whereby the operator's time is used to full advantage.

Various more specific objects and features of the invention will become apparent from the detailed description which follows.

Briefly, the invention consists of a machine having the following elements:

(1) A form including clamps for holding box ends in juxtaposed spaced apart positions while the side and bottom boards are attached thereto;

(2) Guides for aligning the side and bottom boards (which are placed in the machine manually) with the ends;

(3) Guides for spacing the bottom boards from the sides of the box and from each other, the bottom comprising two or more boards;

(4) A nailing mechanism reciprocable up and down above the box holding form for nailing the side and bottom boards to the ends;

(5) Anvils for resisting the thrust on the end boards imparted by the nailing mechanism;

(6) A mechanism for rotating the form after each nailing operation to present the next face of the box to the nailing mechanism and to restore the form to starting position after the last side is nailed. Thus in starting position the form is positioned to receive box ends and shook for first side, which is nailed onto the ends; then the form is rotated 90 degrees and the bottom boards placed and nailed onto the ends; then the form is again rotated 90 degrees and the other side shook placed and nailed onto the ends; after which the form is rotated 180 degrees to bring it back to original position for removal of the assembled box from the form and the placing and nailing of the ends and one side of the next box;

(7) A driving mechanism for actuating the form rotating mechanism, nailing mechanism, and various auxiliary elements in proper timed sequence under the control of the operator.

Numerous auxiliary elements are necessary for the successful operation of the machine but these elements and their functions will appear in the detailed description which follows.

In the drawings:

Fig. 1 is a front elevation of the machine with some parts broken away to better show the construction and some details eliminated;

Fig. 2 is a side elevation of the machine;

Fig. 3 is a detail section taken in the plane III—III in Fig. 1, showing the pinion and sector mechanism for turning the box form, in the position they occupy when the driver head and chucks are down;

Fig. 4 is a view similar to that of Fig. 3 showing the positions of the elements after the driver head and chucks have returned to their elevated positions and the ratchet has turned the box;

Fig. 5 is a detail elevation view in the plane V—V of Fig. 1, showing the mechanism for lifting the revolving box form to permit lateral movement of the nailing anvils, with the parts in elevated position;

Fig. 6 is a view similar to that of Fig. 5 showing the parts in lowest position at the time the nail chucks are resting on a box;

Fig. 7 is a detail horizontal section taken in the plane VII—VII of Fig. 1, showing box heads or ends in the clamping mechanism;

Fig. 8 is a detail plan view of a portion of one of the clamping elements shown in Fig. 7, with the box end clamping members in open position;

Fig. 9 is a detail plan view of the central portion of the anvil table of the machine showing the mechanism for actuating the clamping mechanism illustrated in Figs. 7 and 8;

Fig. 24 is a detail front elevation showing the cleat holding mechanism on the nailing chuck in closed position;

Fig. 25 is a similar view showing the cleat holding mechanism in open position;

Fig. 26 is a detail side elevation corresponding to the front elevation of Fig. 24;

Fig. 27 is an end elevation detail view showing a portion of the clamp actuating mechanism;

Fig. 27a is a detail end view of the cam and roller shown in Fig. 27;

Fig. 28 is a detail end view of the latch and release mechanism for clamping and releasing box ends in the revolving form, showing the latch in released position;

Fig. 29 is similar to Fig. 28, showing the latch in clamped position;

Fig. 30 is similar to Figs. 28 and 29, showing the latch trigger being acted upon by the release finger to release the box head clamps;

Figs. 31 and 32 are detail views of the box head clamping mechanism showing the use of filler blocks for adapting the mechanism for different sized heads; and Fig. 33 is a perspective view of a completed box of the type the machine is adapted to assemble.

*Nailing mechanism*

Figure 10:
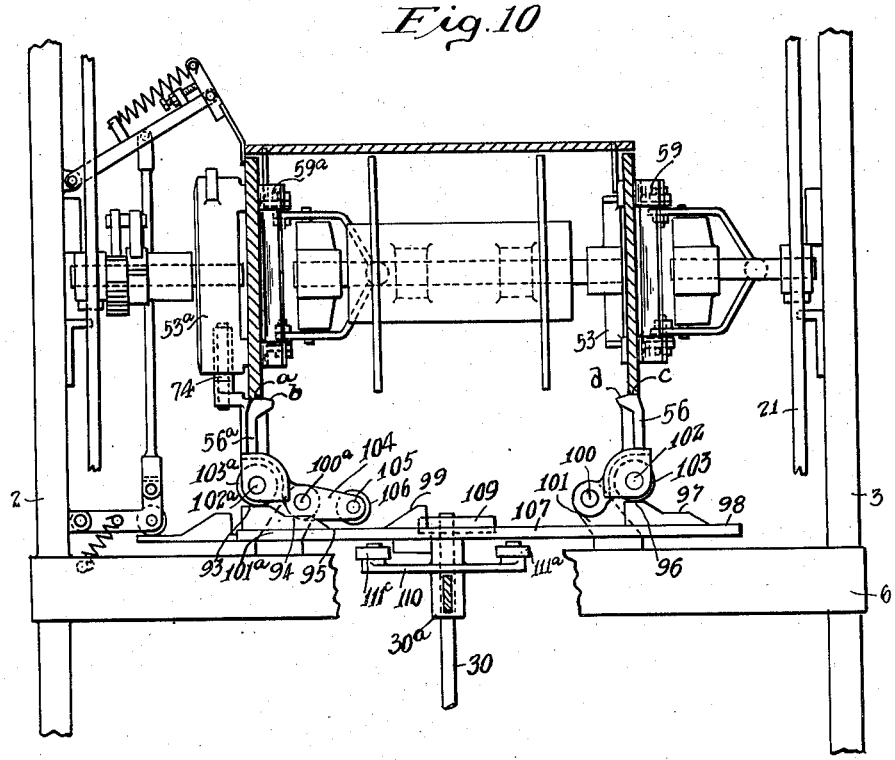
Fig. 10 is a front elevation of the anvil table and box form with two box heads and the first side in nailing position.

Referring to Figs. 1 and 2 the mechanism of the machine is supported on a frame comprising a base 1, a left side frame 2, a right side frame 3, a front top frame tie 4, a rear top frame tie 5, a front table frame tie 6, and a rear table frame tie 6a.

A nailing mechanism is supported from the frame at the upper end thereof and comprises a nail pan 8, and strippers 9 which are of standard construction and need not be described in detail. Suffice it to say that in operation the nail pan 8 is oscillated up and down by links 46 which are pivotally mounted at their lower ends to the outer ends of levers 45 keyed at their other ends to a supporting shaft 45a. The levers 45 are in turn oscillated by a connecting rod 44 which extends downward to the driving mechanism, which will be described later.

Nails are positioned preparatory to driving by means of nail chucks 13 carried on a chuck frame 16 and the nails are distributed to the nail chucks from the nail feed mechanism through nail funnels 11 and nail tubes 12. Nail punches 14 secured to a driver frame 15 are provided to force the nails out of the nail chucks 13 into the box shook. The chuck frame 16 is mounted for vertical reciprocable movement in guides in the side frame members 2 and 3 and is reciprocated from the driving mechanism to be described later through connecting rods 21. The driver frame 15 is likewise independently reciprocable up and down and is reciprocated from the driving mechanism through connecting rods 17. Driving mechanisms of the general type described are old and well known and their specific construction does not constitute a part of the present invention. Suffice it to say that when the chucks are lowered into engagement with box parts by the connecting rods 21 and the punch frame 15 thereafter lowered by the connecting rods 17, nails in the chucks are driven into the box parts by the punches 14. Thereafter upward movement of the connecting rods 21 and 17 carries the nail driving mechanism upward clear of the box parts.

*The power drive*

The machine is driven by an electric motor 37 (Figs. 1 and 2) to the shaft of which is keyed a sprocket 36 which drives a clutch sprocket 34 through a sprocket chain 35. The clutch sprocket 34 is free to turn on a clutch shaft 32 and has mounted on one side thereof a clutch drum 34a adapted to receive the expanding member of a friction clutch which is keyed to the shaft 32. When this clutch is engaged the sprocket 34 is in driving engagement with the shaft 32. The clutch member keyed to shaft 32 is expanded or contracted by longitudinally shifting a clutch collar 47a mounted in concentric relation about the clutch shaft 32 and adapted to be engaged by a yoke 47, which is keyed to a rocker shaft 48, to the opposite end of which shaft (shaft 48) there is keyed a bell crank 49a. A foot pedal 49 is rotatably mounted on a pin 53 secured to the frame of the machine and the rear end 49b of the pedal fits loosely within a hole provided therefor in the horizontal arm of the bell crank 49a so that a downward pressure on the pedal 49 rotates the rocker shaft 48 in a clockwise direction to engage the clutch. The upper end of the vertical arm of the bell crank 49a is pivotally secured by pin 49d to one end of a horizontal rod 49c, the opposite end of which rod is positioned to contact a cam 20a mounted on the inner face of a crank gear 20 so that as the gear 20 rotates the cam 20a periodically forces the horizontal shaft or rod 49c to the left, thereby rotating the rocker shaft 48 in a counterclockwise direction and releasing the clutch. It will be observed that the foregoing mechanism permits manual engagement of the clutch and automatic disengagement thereof after a predetermined movement of the gear 20 dependant upon the shape of the cam 20a.

To positively stop the mechanism driven by the motor 37 through the clutch, a brake is provided. This brake comprises a drum 51 keyed to the clutch shaft 32 and an external contracting brake band 52, constituted by two halves hinged together by the pin 52a. The two halves of the brake band 52 are normally urged into contact with the drum 51 by a compression spring (not shown). To release the brake the lower ends of the two halves of the brake band are separated against the force of the compressing spring and for this purpose the lower ends of the two halves of the brake band are extended downwardly and provided with rollers 52c, one roller being mounted on each brake band extension. The rollers 52c are adapted to be engaged by a wedge-shaped pin 47b secured in a projecting boss on the clutch yoke 47 so that, as the yoke 47 rotates in clockwise direction to engage the clutch, the wedge-shaped pin 47b moves between the rollers 52c and separates them, thereby releasing the two halves of the brake band 52 from the drum 51. It will be observed, therefore, that the brake is automatically released simultaneously with engagement of the clutch and automatically applied upon disengagement of the clutch to immediately stop the mechanism following release of the clutch.

A pinion 31 (Fig. 2) is keyed to the clutch shaft 32 and drives the crank gear 29, which is keyed to the right end of a crank shaft 25. A crank 19 is keyed to the left end of the crank shaft 25 and a crank provided on the crank wheel 20, to which the lower ends of the connecting rods 17 for reciprocating the nail punch frame 15, are pivotally attached. Compression springs 18 are inserted in the connecting rods 17 to provide a certain amount of yield in the connecting rods to compensate for variations in the dimensions of box parts.

Crank shaft 25 also has keyed thereto chuck frame lift cams 24 which engage with cam rollers 23 attached by means of pins 23a to the ends of radius arms 22 (Fig. 2) which are free to turn on a shaft 33 extended between the side frames 2 and 3. The lower ends of the connecting rods 21, the upper end of which are secured to the nail chuck frame 16, are also pivotally secured to the pins 23a so that as the rollers 23 are raised or lowered by the cams 24 the chuck frame 16 is raised and lowered in timed relation to the up and down movement of the driver frame 15.

To drive a mechanism which will be described in greater detail later in connection with the anvils of the machine, a vertical shaft 30 is provided having a disc 29 keyed to the lower end thereof which is in driving engagement through a shear pin 28 with a beveled gear 27, which is driven by a beveled pinion 26 keyed to the shaft 25.

*Box form and operating mechanism therefor*

Referring now to Fig. 7, which is a plan view of the revolving box form or clamping jig, it will be observed that the box supporting elements are rotatably supported by an axle shaft which is divided into three sections 55, 60 and 55a, respectively, reading from the left to right. The left section 55 of the axle is journalled to turn in a bearing 57 in the end of a radius arm 61 (shown to better advantage in the end elevational views of Figs. 5 and 6), which is free to turn on a shaft 62. Likewise, the right end section 55a of the axle is journalled to turn in a bearing 57a in the end of a radius arm 61a, which is rotatably mounted on a shaft 62a. The left axle section 55 is rigidly secured to a clamping head 53a. The right axle section 55a is rigidly secured to an arm 63 attached to the clamping head 53. The right end of the center axle section 60 is rigidly secured to the clamping head 53 and the left end of section 60 is rigidly secured to an arm 63a attached to the clamping head 53a. A counter-weight 165 is rigidly secured to the center axle section 60 and serves to balance the revolvable form.

The clamping mechanism for clamping the box ends and for releasing them will be explained with reference to Figs. 1 and 8, in both of which the box end clamps 59 and 59a are shown in open or retracted position ready to receive or release the box ends. Each clamping head 53 and 53a is provided with a flat surface X and Y, respectively, which constitutes the stationary aligning element of each clamping head, the surface X contacting the outside and the surface Y contacting the inside of the respective box ends to facilitate the removal of a finished box. The head clamps 59 are rotatably mounted on pins 160 (Fig. 8) secured to the ends of head clamp levers 158, which levers are fulcrumed by pins 159 to the arms 63 and 63a, respectively, of the clamping heads 53 and 53a. Torque springs 161 serve to yieldingly hold the clamps 59 and 59a in angled relation to the surfaces X and Y to present open mouths for quickly and easily receiving box ends when placed therein by hand.

Holes are provided in the ends of the levers 158 which loosely receive threaded connecting rods 156, each of which is provided with an adjusting nut 155a on one end and an eye in the other end for receiving a pin 157 (Fig. 7) in the end of a crank 136 keyed to a rocker shaft 137. The rocker shaft 137 is rotatably mounted in bearings 162 attached to the clamping heads. Around the connecting rods 156 there are positioned compressing springs 155, which are compressed between the ends of the levers 158 and adjusting nuts 155a (Fig. 8), thereby providing telescoping universal joint connectors between the levers 158 and the connecting rods 156. It will be seen that a slight rotation of the shaft 137 in a clockwise direction (with reference to Fig. 27) will open the box end clamps 59, as shown in Fig. 8, and that a slight rotation of the shaft 137 in the opposite direction will close the clamps 59, as shown in Fig. 7.

Considering further the form supporting and rotating structure with reference to Figs. 5 and 6, the radius arms 61 and 61a (the arm 61a being at the opposite end of the form and not shown in Figs. 5 and 6) normally rest on brackets 64, which are secured to the side frames 2 and 3, when there are no box ends in the clamping heads, and the connecting rods 21 for reciprocating the nail chuck frame 16 are in lowered position, as shown in Fig. 6, under which conditions the box form and clamping heads are supported entirely by the axles 55 and 55a in all positions of rotation except the position in which the bottom boards of the box are nailed to the ends. When there are box ends in the clamping heads and the chuck frame 16 is in lowered position, the radius arms 61 never touch the brackets 64 and the box and clamping heads are supported on anvils 56 and 56a, as shown in Fig. 10. When the chuck frame 16 and connecting rods 21 are in elevated position, as shown in Fig. 5, the projections 65 on the connecting rods 21 lift the radius arms 61 and 61a and the clamping heads with the box ends off the anvils 56 so that the anvils 56 have clearance to move horizontally under the box ends prior to nailing and horizontally out from under the box ends clear of the form to permit rotation of the latter into a new position.

The box form is rotated to successively present different faces of the box to the nailing mechanism and to restore the form to its starting position following the nailing of the last side by the following mechanism:

Referring to Figs. 3, 4 and 7, a tension spring 72 having a plug in each end is provided with screw eyes attached to the respective plugs which are secured by pins 73 and 71 to the driver frame 15 and to the end of an arm 70, respectively. Arm 70 is rigidly keyed to a rotatable shaft 62, to which there is keyed a sector gear 69. The sector gear 69 meshes with a sector pinion 66 which is rotatably mounted on the axle shaft 55. There is secured to the sector pinion 66 a radius arm 66a on which is pivotally mounted by means of a pin 68a a ratchet pawl 68. The ratchet pawl 68 is in driving engagement with a three-tooth ratchet 67 which is keyed to the axle shaft 55. A projection 75 on the arm 70 is adapted to contact with the frame 2 and act as a stop to limit the rotation of the sector gear 69 in response to upward movement of the spring 72. Inside of the spring 72 is a rod 76 which acts as a stop to limit the contraction of the spring 72.

Figure 12:
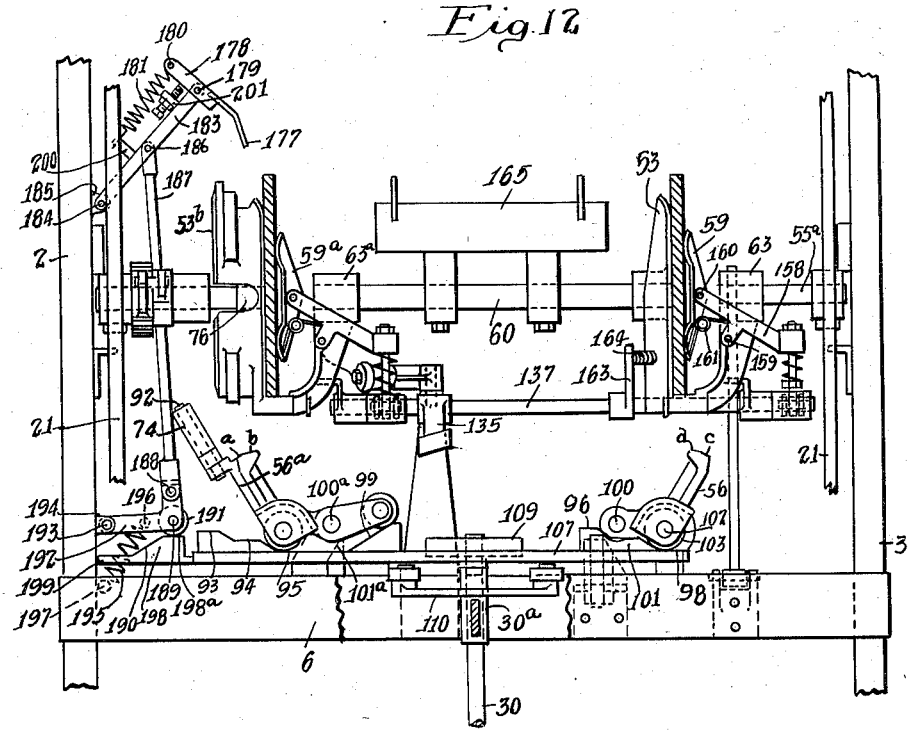
Fig. 12 is similar to Fig. 10, showing the position of the mechanism after the first operation with the box form turning into the next position and the anvils swung outward to clear the revolving form and the left hand shook stop elevated to clear the revolving form.

The teeth in the three-tooth ratchet 67 are not spaced equally but instead are spaced 90 degrees, 90 degrees and 180 degrees apart, respectively. When the driver frame 15 moves to its lowest position (at the completion of a nail driving operation) spring 72 contracts until the plugs which are screwed into its ends contact with the rod 76, thereby forcing the arms 70 downward and revolving the sector gear 69 clockwise (with reference to Fig. 3) which in turn revolves the pinion sector 66 counterclockwise, which in turn revolves the pinion sector 66 and the arms 66a and the ratchet pawl 68, counterclockwise. The pawl 68 thereby engages one of the three ratchet teeth and as the driver frame subsequently moves upward, the spring 72 is stretched or extended, thereby exerting the upward pull on the arms 70 and a torque on the shaft 55 tending to turn the latter in a clockwise direction but the shaft 55 is restrained from turning by a roller 74 (Figs. 10 and 20) lying in one of three slots 76, 76a or 76b in the clamping head 53a until the driver frame 15 and the chuck frame 16 nearly reach the tops of their strokes, at which time the roller 74 is automatically withdrawn from the slot in the clamping head 53a, as shown in Fig. 12, (the mechanism for actuating the roller 74 will be described later), thereby releasing the box form which is then rotated by the spring 72 in a clockwise direction with reference to Fig. 3 or in a counterclockwise direction with reference to Figs. 20 and 21, as shown by the arrows in those figures.

Figure 14:
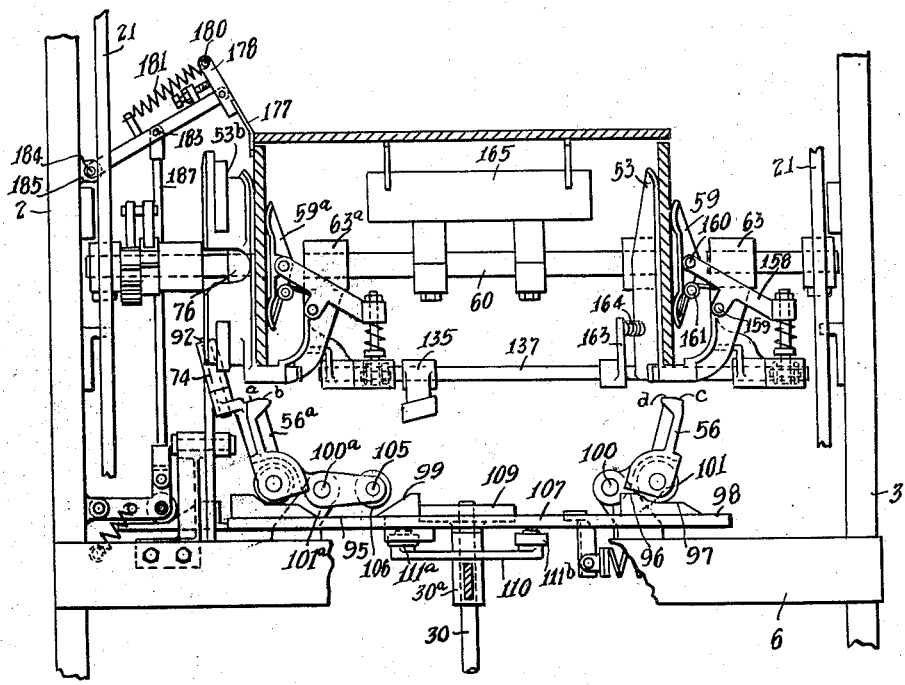
Fig. 14 is similar to Fig. 12 with the parts in position they occupy at the completion of the first operation, in position for nailing on the bottom shook.
Figure 16:
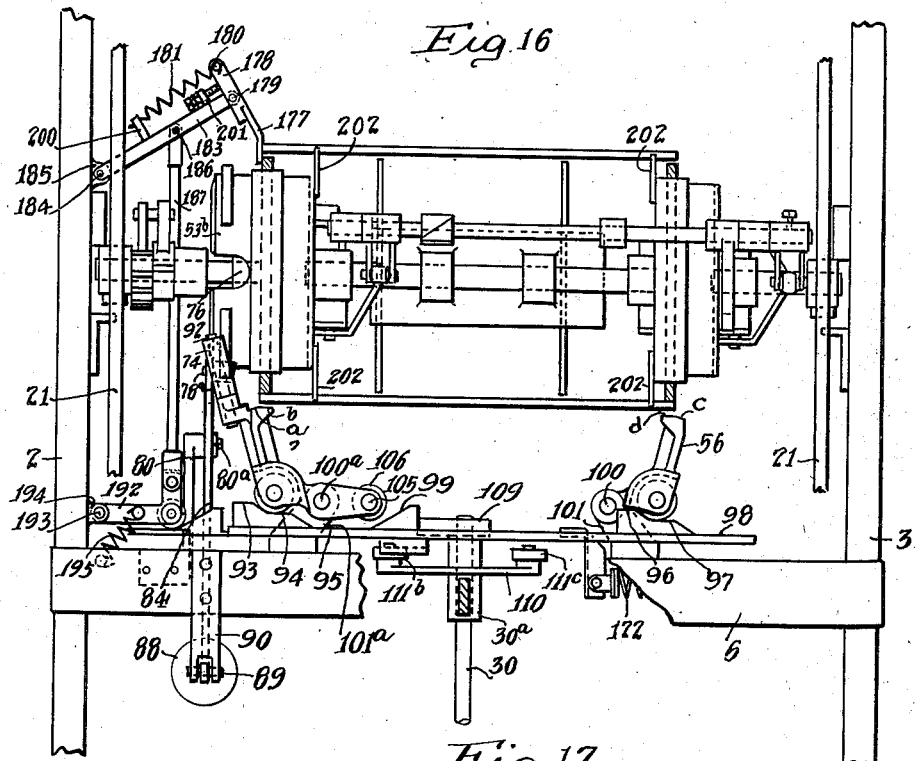
Fig. 16 is similar to Figs. 10, 12 and 14 except that the parts are shown in the position they occupy after the bottom has been nailed on and the form rotated 90 degrees into the position for nailing on the last side.

The rotation of the box form by the power of the spring 72 continues until the roller 74 (Figs. 20 and 21) drops into the next slot in the clamping head 53a. It will be observed that the slots 76 and 76a are spaced apart 90 degrees, slots 76a and 76b are spaced apart 90 degrees, and slots 76b and 76 are spaced apart 180 degrees, corresponding to the spacing of the three teeth of the ratchet 67 previously referred to (Figs. 3 and 4). The slot 76 determines the initial position of the box form in which the box ends are inserted and the first side nailed on, as shown in Fig. 10, the slot 76a determines the position of the box form for nailing the bottom, as shown in Figs. 12 and 14, and the slot 76b determines the position of the box form for nailing the last side, as shown in Fig. 16. Following the nailing of the last side, the box being then completed, the form must be revolved 180 degrees in order to permit removal of the box from the form and the insertion of the parts for assembling the next box. This last movement brings the first slot 76 again into registration with the roller 74 and the form is positioned as shown in Fig. 10.

The reason for revolving the box form by the spring 72 is that the main driving mechanism of the machine comes to rest when the driver frame 15 and the nail chuck frame 16 reach the top of their strokes, as shown in Fig. 4. The box cannot revolve until the nail chucks have been elevated sufficiently above the box to clear the corners of the latter as it turns. Therefore, it is necessary to store up energy in the spring 72 to do the work of turning the box form after the main driving mechanism of the machine has come to rest.

Figure 20:
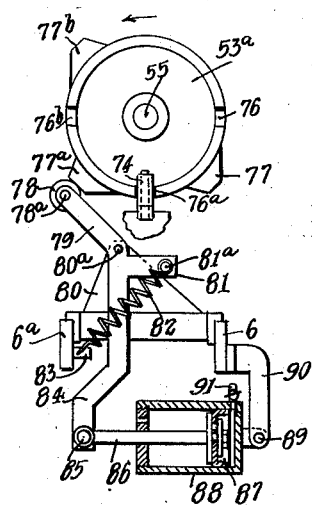
Fig. 20 is a detail elevational view of the revolving index head and cooperating apparatus for decelerating and stopping the form after each movement.
Figure 21:
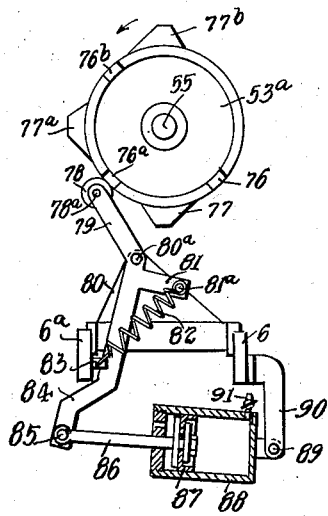
Fig. 21 is similar to Fig. 20 showing the form while in transit into the position shown in Fig. 20.

To avoid shock and to facilitate the entry of the rollers 74 into the slots 76, 76a and 76b, a decelerating mechanism for the form is provided and will now be described with reference to Figs. 16, 17, 20 and 21. Referring to Figs. 20 and 21, the clamping head 53a is provided on its periphery with three cams 77, 77a and 77b spaced apart 90 degrees, 90 degrees and 180 degrees, respectively, corresponding to the angular spacing of the three teeth on ratchet 67 and to the three slots 76, 76a and 76b. Positioned adjacent the cams 77, 77a and 77b is a cam roller 78 rotatably mounted on a pin 78a in the end of the upper arm 79 of a lever 84. Lever 84 is pivotally mounted on a pin 80a secured to the bracket 80 which in turn is secured to the front table tie and the rear table tie 6a on the frame of the machine. Lever 84 is also provided with a side arm 81, to the end of which is attached by a pin 81a one end of an extension spring 82, the other end of which spring is secured by a pin 83 to the rear table tie 6a. Spring 82 functions to hold the cam roller 78 against the cams 77, 77a and 77b. A bracket 90 is rigidly secured to the front table tie 6 and pivotally supports at its lower end by means of a pin 89 an air compression cylinder 88. Cylinder 88 contains a piston 87 mounted on a piston rod 86, the outer end of which is pivotally mounted by pin 85 to the lower end of the lever 84. An adjustable relief cock 91 is provided on the cylinder 88 which controls the escape of air from the cylinder.

Fig. 21 shows the box form being revolved from its previous position of rest into the position shown in Fig. 20, at which time the cam 77a is approaching the cam roller 78 and the slot 76a is approaching the position in which it will receive the roller 74. As the cam 77a contacts and shifts the roller 78, the piston 87 is actuated by the lever 84 to compress the air in the cylinder 88 and, since the air compressed in the cylinder 88 can only escape slowly therefrom through the cock 91, considerable resistance is offered to the movement of the rotating form, thereby slowing it down as the slot 76a approaches the roller 74 so that the roller 74 has ample time to enter the slot and stop the form. Oviously the same decelerating effect will be produced upon the box form as it approaches each of the other two positions of rest in which the roller 74 engages with the slots 76b and 76, respectively.

*Anvil actuating and form indexing mechanism*

Thus far, mechanism has been described for receiving a pair of box ends and supporting them in position to receive one side board, rotating the ends to 90 degrees in a position to receive the bottom shook, rotating the box ends into position to receive the other side shook, and thereafter rotating the box ends into the original position for the removal of the completed box and insertion of ends and one side of the next box. In each position the nailing mechanism is automatically actuated and thereafter the box form automatically turned into the next position in response to depression of the foot pedal by the operator.

To support the box ends during the nailing operation and prevent the thrust imparted by the nailing mechanism from being transmitted to the axle shafts 55 and 55a, anvils 56 and 56a (Fig. 10) are provided which contact directly with the lower edges of the box ends while the side boards are being nailed and with the clamping heads while the bottom is being nailed.

Because of the fact that it is necessary to maintain the upper or nailing surface of the box parts at the same elevation in all three positions of the form whereas the vertical dimensions of the box are different in the three different positions of orientation, the anvils must be differently adjusted as to height in the three positions. Furthermore, the anvils must be shifted out of the way during rotation of the box to clear the corners thereof. It is also necessary to provide a mechanism for actuating the rollers 74 which stops or indexes the rotating form in each position of rest. These various mechanisms are closely related and will be described together.

Referring to Fig. 1, the vertical shaft 30 is revolved, as previously stated, by the beveled gears 26 and 27. The ratio of the gears 26 and 27 is three to one so that for each revolution of the crank shaft 25 the vertical shaft 30 revolves one-third of a revolution. The upper end of shaft 30 is supported by a bearing 30a attached to the table tie 6 and 6a and there is keyed to the shaft 30 just above the bearing 30a a disc 110 having the shape of an equi-lateral triangle (Fig. 11), in each corner of which are secured a vertical pin on which rollers 111a, 111b and 111c are rotatably mounted. There is also keyed to the shaft 30 just above the disc 110 a cam disc 109 having two cylindrical surfaces 109a and 109b, respectively, of different radii but both concentric with respect to shaft 30.

For supporting the anvils there are secured to the front table tie 6 two bearing brackets 101 and 101a (Fig. 10) and to the rear table tie 6a there are secured two similar bearing brackets also numbered 101 and 101a. Extending through and beyond the bearing brackets 101a is a shaft 100a which is rigidly secured by set screws 100b to the brackets 101a. A similar shaft 100 extends through and is secured to the brackets 101. The outer ends of these shafts 100 and 100a serve as trunnions on which the anvils 56 and 56a, respectively, are oscillatably mounted.

Slidably supported on shoulders of the four brackets 101 and 101a are two rectangular sliding bars 107 and 107a, respectively. To these two sliding bars there are welded two cross members 107b and 107c (Fig. 11), the two sliding bars and cross members constituting a rectangular integral frame which is free to oscillate from left to right and right to left, the whole structure being slidably supported as described from the table tie bars 6 and 6a. A projection 108 is welded to the central part of the cross member 107b which is adapted to contact with the surfaces 109a and 109b of the cam 109, the latter acting as a stop for positioning the frame 107 in two different positions; the frame 107 is at all times urged to the right by an extension spring 122 secured at one end to the cross member 107c by pin 123 and secured at the other end to the side frame 3 by screw 124.

Figure 11:
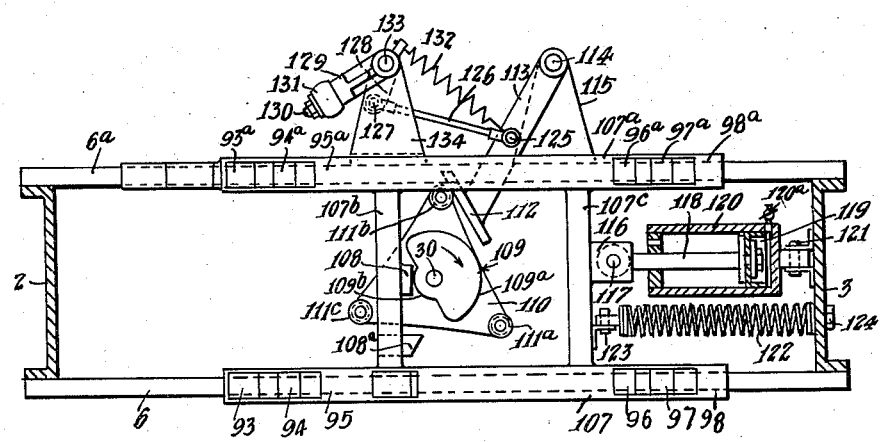
Fig. 11 is a plan view of the anvil table, showing the sliding frame and cams for raising and lowering the swinging anvils with the mechanism in the same position as shown in Fig. 10.

There is also welded to the lower face of the cross member 107b a block 108a which is positioned to intercept the three rollers 111a, 111b and 111c as the triangular plate 110, on which they are supported, rotates in a clockwise direction (with reference to Fig. 11). When one of the three rollers 111a, 111b and 111c strikes the block 108a, the whole frame 107 is moved to the left, against the tension of spring 122, until the roller slips off the block 108a, at which time the extension spring 122 pulls the frame 107 to the right until the projection 108 strikes one of the surfaces of the cam 109.

To prevent shock resulting from rapid movement of the frame 107 as the projection 108 encounters the cam 109, an air cylinder 120 is provided, the cylinder being attached to the side frame 3 by a pin 121. A piston 119 within the cylinder 120 is attached by a piston rod 118 to the cross member 107c, the end of the piston rod being pivotally secured to a projection 116 on the cross member 107c by a pin 117.

The frame 107 may be adjustably decelerated in its movement to the right by adjusting a release cock 120a which controls the release of air compressed in the cylinder 120 by the piston 119.

Figure 13:
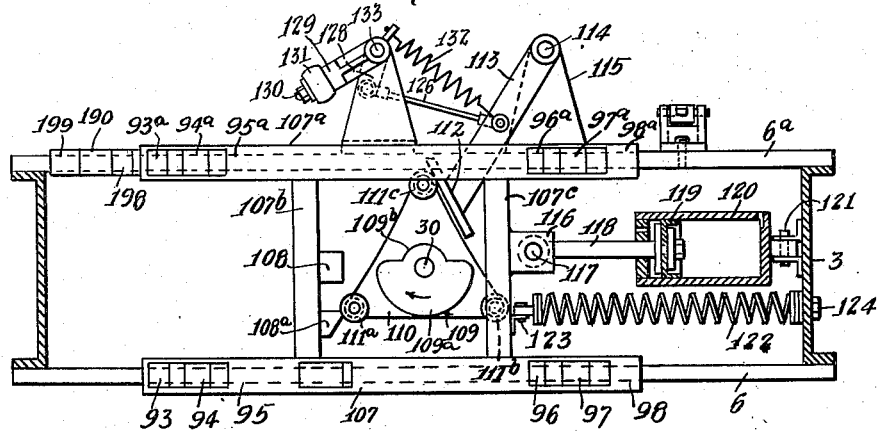
Fig. 13 is a plan view of the anvil table similar to Fig. 11 but with the parts positioned to coordinate with Fig. 12.
Figure 15:
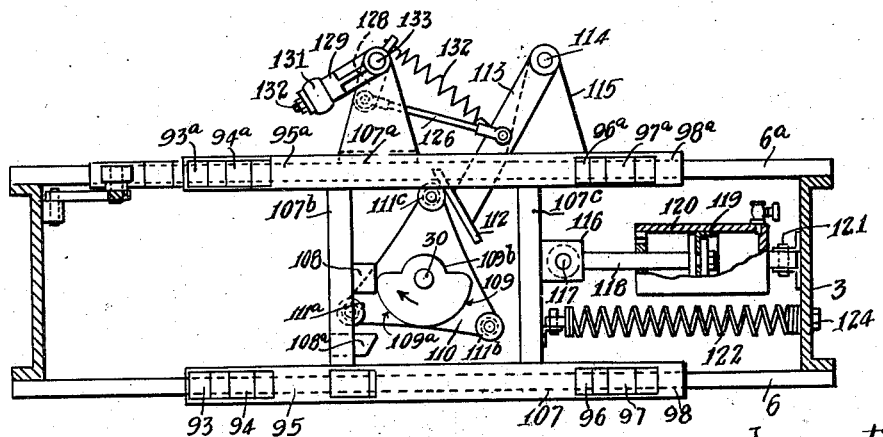
Fig. 15 is similar to Figs. 11 and 13, with parts positioned to coordinate with Fig. 14.
Figure 17:
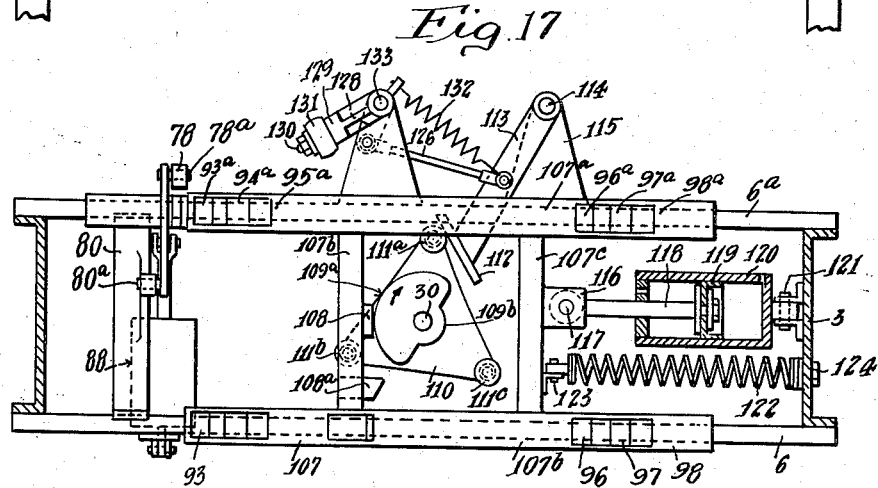
Fig. 17 is similar to Figs. 11, 13 and 15, with the parts positioned to coordinate with Fig. 16.

As shown in Fig. 11, the roller 111c has cleared the block 108a and the frame 107 has been moved to its extreme right position by spring 122, bringing the projection 108 against the surface 109b of short radius on the disc 109. In Fig. 13 the shaft 30, cam 109 and disc 110 have rotated a little less than 120 degrees so that the roller 111a is contacting the block 108a and has moved the frame 107 into extreme left position. In Fig. 15 the shaft 30 has rotated slightly farther so that the roller 111a has released the block 108a and the projection 108 has stopped against the cam surface 109a, thereby stopping the frame 107 in an intermediate position. In Fig. 17 the shaft 30 has rotated through another 120 degrees from the position shown in Fig. 15 and the roller 111b has just released the block 108a and the projection 108 has again stopped against the cam surface 109a, thereby again stopping the frame 107 in an intermediate position. It is apparent therefore that during a complete revolution of the shaft 30 the frame 107 is stopped twice in intermediate position and once in the extreme right position. The purpose of so stopping the frame 107 will now be explained.

It will be observed that on each of the four corners of the frame 107 (Figs. 10 and 11) there is a cam formation having three level surfaces connected by inclined surfaces. Thus on each sliding bar 107 and 107a at the left end there is a high cam surface 93 and 93a, respectively, (Figs. 10 and 11). Likewise at the opposite end of each of these bars there is a high cam surface 96 and 96a, respectively. Adjacent these high cam surfaces 93, 93a, 96 and 96a, respectively, are intermediate cam surfaces 94, 94a, 97 and 97a, and next to the intermediate surfaces are low cam surfaces which are identical with the surfaces of the frame 107 and are indicated at 95, 95a, 98 and 98a, respectively.

Figure 22:
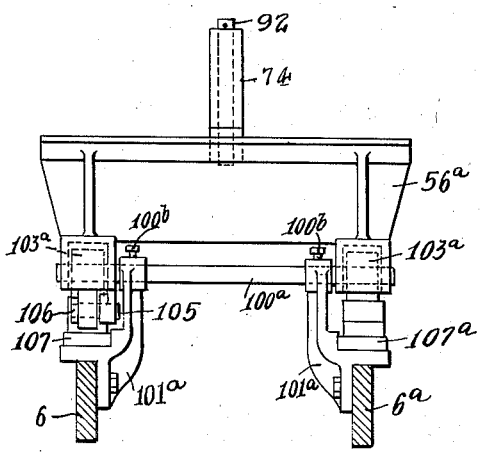
Fig. 22 is a detail side elevation of the left nailing anvil and supporting structure, the supporting frame being shown in section.

As was previously mentioned with reference to Fig. 22, the anvils 56 and 56a are rotatably supported upon trunnions 100 and 100a. The anvil 56a (Fig. 10) is provided with a pair of rollers 103a rotatably mounted on pins 102a. These rollers 103a are positioned substantially directly beneath the anvil surfaces a and b, and rest on the three level cam surfaces 93, 93a, 94, 94a, 95 and 95a, or the inclined surfaces connecting them, depending upon the position of the cam frame 107. The anvil 56 is similarly supported from the cam surfaces 96, 96a, 97, 97a, 98 and 98a, or the inclined surfaces connecting them, on rollers 103 rotatably mounted on the anvil by pins 102.

It will be apparent that when the frame 107 is in its extreme right position the anvils 56 and 56a are supported on the high surfaces 93, 93a, 96 and 96a, thereby preventing high anvil surfaces a and c, respectively, for the box ends to rest on while nailing the first side, as shown in Fig. 10. It will also be observed that the roller 74 is mounted on the anvil 56a and is moved into the slot 76 (Figs. 7, 12 and 20) of the clamping head 53a under these conditions.

Immediately after the nails are driven in the first side (the position shown in Fig. 10) the box form is lifted off the anvils by the lugs 65 on the connecting rods 21 (Fig. 5) as the nail chuck ascends into its upper position, and immediately following the lifting of the box form the frame 107 is moved to its extreme left position, as shown in Figs. 12 and 13, thereby bringing the low surfaces 95, 95a, 98 and 98a on the frame 107 below the rollers 103 and 103a and permitting the anvils to rotate outwardly on their supporting trunnions so that they lie clear of the box form to permit it to revolve; at the same time the outward movement of the anvil 56a carries the roller 74 clear of the slot 76 in the clamping head 53a so as to permit the box form to be revolved by the spring 72 (Figs. 3 and 4). To positively remove the roller 74 from the slot 76 an additional roller 106 is mounted on an extension arm 104 on anvil 56a, which is engaged by a cam 99 on the frame 107 when the latter moves into extreme left position.

The timing of the shaft 30 is such that immediately after the roller 74 is removed from the slot 76, the roller 111a (Fig. 13) releases the block 108a, thereby permitting the frame 107 to be pulled to the right by the spring 122 until the roller 74 contacts with the concentric rim 53b of the clamping head 53a. The roller 74 thereafter rides on the rim 53b, being held in engagement therewith by the tension of spring 122 acting through the frame 107 and the inclined cam surfaces interconnecting the surfaces 95a, 94a, 95 and 94, respectively, until the box form has revolved 90 degrees, at which time the roller 74 enters the slot 76a in slot 53a and the rollers 103 and 103a ride up onto the intermediate cam surfaces 94, 94a, 97 and 97a, permitting the frame 107 to be moved into intermediate position by the spring 122, in which position projection 108 rests against the cam surface 109a (Figs. 13 and 15). This leaves the box ends and box form in position to receive the bottom boards for nailing and as the chuck frame 16 and driver frame 15 descend to drive the nails, the clamping heads will be lowered onto the anvil surfaces b and d by the lug 65 (Fig. 5) on the connecting rods 21. The clamping heads are so dimensioned that when they rest on the anvil surfaces b and d the upper edges of the box ends are at the proper elevation for nailing.

After the nails are driven in the bottom, the form rotating or indexing operation is repeated, the form being rotated 90 degrees into the position for nailing the last side and the anvils 56 and 56a being left supported on the intermediate cam surfaces 94, 94a, 97 and 97a because of the fact that the projection 108 on frame 107 is still brought to rest against the cam surface 109a by the spring 122, as shown in Figs. 16 and 17. After the last side is nailed on, the indexing operation is then repeated revolving the box and form 180 degrees and leaving it again in the first position, as shown in Figs. 10 and 11, so that the box can be removed and the new ends and first side of another box can be placed in nailing position.

The object of providing the intermediate cam surfaces 94, 94a, 97 and 97a and the auxiliary box engaging anvil surfaces b and d on anvils 56a and 56, respectively, is to provide a lower anvil for nailing the last side of the box than when nailing the first side of the box. This is necessary because the vertical dimension of the box when the last side is being nailed is greater by the thickness of one side board than when the first side is being nailed, and if the same nailing plane is to be maintained in both operations the anvil must be lower while nailing the last side than while nailing the first side. It has also been found convenient to employ the anvil surfaces b and d, respectively, for supporting the clamping heads during the nailing of the bottom boards. However, this is not essential as the height of the upper edges of the box ends, when in position for nailing the bottom boards, may be regulated by varying the distances between the clamping head surfaces which rest on the anvils and the surfaces which support the lower edges of the box ends.

*Box end clamping and releasing mechanism*

The clamping structure for actually engaging the box ends has been previously described with reference to Fig. 8 but the apparatus for actuating the clamps in proper timed sequence to the other operations of the machine was omitted. It will be apparent that the automatic clamping of the box ends must take place before the nails are driven in the first side and the box ends must be held firmly thereafter during the subsequent indexing of the box form and nailing of the three sides of the box, after which the box must be released just as or after the box form comes to rest following its last movement of 180 degrees. The apparatus for performing these functions will now be described.

Rigidly secured to the rocker shaft 137 (Figs. 7 and 8) near the clamping head 53, is a radius arm 138 (Figs. 28, 29 and 30) having a square end 146 and a lateral arm 145. A rigid trigger 149 is pivotally mounted by a pin 142 secured to the clamping head. Trigger 149 has two ratchet teeth 143 and 144 and is held against radius arm 138 by a spiral spring 141. As previously described, a slight rocking of the shaft 137 in a clockwise direction opens the box end clamps 59 and reverse movement in a counterclockwise direction closes the clamps 59. When the end 146 of the arm 138 is held by the tooth 143 of the ratchet trigger 149, as in Fig. 29, the box ends are in clamped position and the springs 155 (Fig. 7) are slightly compressed to compensate for variation in the thickness of the box ends. When the ends 146 of the arm 138 is held by the ratchet tooth 144, as in Fig. 28, the box end clamps are open.

Shaft 137 (Fig. 7) has keyed thereto a radius arm 163, to the end of which there is attached a tension spring 164 which tends to rotate the shaft 137 in such position as to hold the box end clamps 59 in open position. There is also keyed to the shaft 137 a radius arm 135, the outer end 135a of which is triangular in shape, as shown in Fig. 27a, adapted to engage with a spherical roller 131 rotatably mounted on the outer end of a radius arm 129, which is keyed to the upper end of a vertical shaft 133, the latter being journalled in bearings 134 and 134a supported from the cross tie 6a on the frame of the machine. The radius arm 129 is free to swing from an angle of about 60 degrees from the position shown in Fig. 8 to the position shown in Fig. 9 and moved from the position shown in Fig. 8 to the position shown in Fig. 9 and then returns once during each nailing operation. The shaft 133 is moved by crank 128 keyed to the lower end thereof, the outer end of which is pivotally connected by a pin 127 to one end of a connecting rod 126 (Fig. 9), the other end of which is pivotally secured by a pin 125 to a mid point on a lever 113 which is fulcrumed on a pin 114 supported from the rear table tie 6a by a bracket 115. The lever 113 is provided on its free end with an inclined surface 112 positioned in the path of the rollers 110a, 110b and 110c on the triangular disc 110. As previously described, the disc 110 rotates through 120 degrees during each nailing operation, bringing one of the three rollers 110a, 110b or 110c into contact with the angled end 113a of the lever 113, thereby swinging the lever to shift the arm 129 from the position shown in Fig. 8 to that shown in Fig. 9, and as the roller slips off the angled end 113a the lever 113 is returned to its original position by the extension spring 132, thereby shifting the arm 129 back into the position shown in Fig. 8. When the arm 129 swings from the position shown in Fig. 8 to the position shown in Fig. 9, the roller 131 contacts with the angled surface 135a of the arm 135 (Fig. 27a), thereby lifting the arm 135 and rotating the shaft 137 in the proper direction to clamp the box ends. This clamping action is timed to take place just before the first side is nailed on and, as the box form stops in this position only once during each revolution, the cam 135a is actuated by the roller 131 once during each revolution of the parts 53 and 53a. It will be apparent that whenever the shaft 137 is rotated into clamping position, as outlined, by actuation of the lever 113, it is retained in clamping position by the ratchet tooth 143 (Fig. 29), which engages with the end 146 of the arm 138. Therefore, following insertion of box ends into the open clamps the ends are gripped by the clamps following the initial actuation of the foot pedal and are thereafter retained in clamped condition until released as follows:

As the box form revolves in the direction indicated by the arrows in Figs. 28, 29 and 30, and the box form is about to stop for the last time to discharge the finished box, the end 148 of the ratchet trigger 149 strikes the upper end 147 of a vertical rod 139, which is pivotally supported at its lower end by a pin 150 to a bracket 151 mounted on the rear table tie 6a. An adjustable stop screw 152 and a compression spring 153 normally hold the vertical rod 139 in proper position to engage the end 148 of the ratchet trigger 149. The engagement of the upper end 147 of the vertical rod 139 with the end 148 of the ratchet trigger 149 lifts the tooth 143 of the ratchet trigger out of contact with the end 146 of the arm 138, permitting the end 146 to strike the tooth 144 of the ratchet trigger 149. Simultaneously, the projection 145 of the arm 138 strikes the side of the vertical rod 139 forcing its end 147 out of contact with the end 148 of the ratchet trigger 149, as shown in Fig. 28, leaving the ratchet lever to be pulled down by the spring 141. As before stated, the movement of the arm 138 from the tooth 143 to the tooth 144 releases the box end clamps 59 and 59a.

Shook stop gage

To position the first and last sides and bottom boards endwise so that their ends will be flush with the outside of the box ends, a movable stop gage is provided. This stop gage comprises a contact blade 177 (Fig. 12) adapted to be positioned flush against the outer upper surface of the left box end and project thereabove so that, by placing the boards against the stop, the left end of the boards will be flush with the outer surface of the box end. Obviously, the stop gage has to be moved clear of the box form while the latter is revolving so as to clear the corners of the box and the clamping head. The gage is, therefore, elevated and withdrawn to the left automatically preliminary to movement of the box form. To this end, the stop gage proper 177 is welded to a lever 178 pivotally mounted by a pin 179 to one end of a lever 183, the other end of which is pivotally mounted by a pin 184 to the left frame member 2 of the machine. The upper end of the lever 178 is attached by a pin 180 to one end of an extension spring 181, the other end of which is secured to a projection 200 on the lever 183. An adjustable stop screw is threaded into projection 201 of the lever 183 to limit the movement of the lever 178 in response to the force exerted thereon by spring 181. This adjustable screw 182 provides an adjustment for accurately positioning the stop gage 177 laterally.

Figure 23:
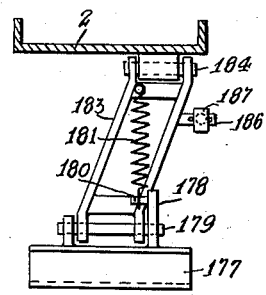
Fig. 23 is a detail plan view showing the left shook stop, a portion of the frame member of the machine being shown in section.

Referring now to Fig. 23, it will be observed that the lever 183 really constitutes a double frame of parallelogram outline. Near the center of the lever 183 there is attached a pin 186 upon which is rotatably mounted one end of a connecting rod 187. The lower end of the connecting rod 187 is pivotally connected by a pin 188 (Fig. 12) to a projection on a radius arm 192 which is pivotally secured at its opposite end to the frame 2 by a pin 193. The radius arm 192 is provided with a roller 191 on its free end, which rolls on the upper flat surface 198a, the inclined surface 190 and the lower flat surface 199 of a cam 198, which is a part of the frame 107. It will be apparent that when the frame 107 is in the extreme left position (which is the position it occupies while the box form is revolving) that the stop gage will be in the elevated position shown in Fig. 12 so as to clear the box form and the corners of the box, and that when the frame 107 is in either its intermediate or its right hand position (during the nailing operations) the stop gage 177 is moved into lowered position, as shown in Fig. 16, preparatory to the placing of the sides and bottoms of the box. An extension spring 195 attached at one end to the arm 192 by the pin 196 and at the other end to the table tie 6a by the pin 197, holds the roller 191 in contact with the cam 198 at all times.

Miscellaneous features

To position the sides of the box so that they will lie flush with the top of the ends, the stop gages 202 (Fig. 16) are provided. These stop gages are rigidly secured to the clamping heads and do not interfere with the removal of the box. They are shown to better advantage in the end view of Fig. 27.

Since the sides of the boxes for which the present machine are designed each comprise a single board, only one pair of stop gages 202 is required for each side, although other yielding and adjustable stop gages could obviously be provided should it be desired to make a box having more than one board on each side. However, the bottom is designed to be made up of two boards, and it is therefore desirable to provide a special set of guides for properly aligning these bottom boards. As has been previously mentioned, the large casting 165 on the form, serves as a counterweight to balance the box form and also as a frame or support for the shook stop gages for positioning the bottom boards. Thus, referring to Figs. 18 and 19, the counterweight 165 is provided with two channels in which runners 166 are slidably positioned. These runners 166 support fingers 167 against which the bottom boards are placed. The fingers 167 are provided with elongated slots 175 in which there are positioned screws 176 for securing the fingers to the runners. The slide is provided for longitudinal adjustment of the fingers. The runners 166 are locked within the channels in the counterweight 165 by screws 170 which extend through two rectangular openings 169 in each runner, the rectangular openings being so located as to permit of horizontal and vertical movement of the runners. Each runner is normally held in left position with the ends of the openings 169 against the screws 170, as shown, by a tension spring 168, which is secured at one end to a screw 174 attached to the casting 165 and at the other end to the runner by a pin 173. Compression springs 171 are also provided mounted in holes in the casting 165 and acting through plungers 172 to normally hold the runners in uppermost position against the screws 170.

Figure 19:
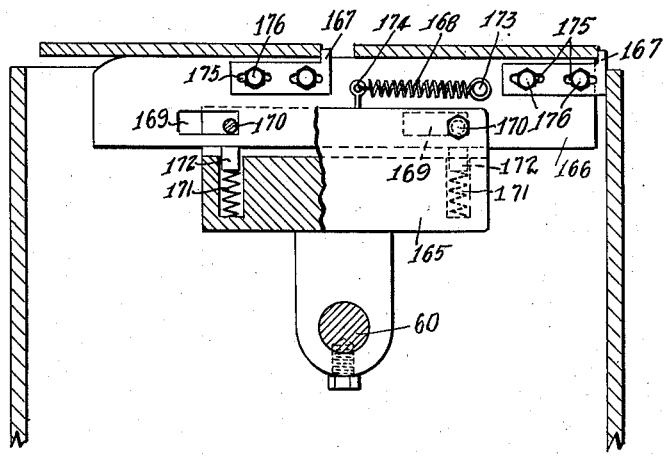
Fig. 19 is a section in the plane XIX—XIX of Fig. 18, showing the construction of the shook stops.

The upper edges of the runners 166 support the bottom boards as they are placed in position and to this end the runners are placed slightly above the normal heights of the box ends to facilitate rapid placing of the bottom boards in position against the fingers 167. Owing to the inaccuracy of the dimensions of the box ends employed, there is appreciable variation in the amount the fingers 167 extend above the box ends. When placing the bottom boards, the operator takes two boards in one hand and slides them along the runners 166, the fingers 167 being slightly less in height than the thickness of one board, causes one board to be deposited or stopped against the first pair of fingers 167 while permitting the second board to slide over the first board and the first pair of fingers into position against the second pair of fingers, as shown in Fig. 19. If the bottom boards were to be placed directly on the box ends, considerable inconvenience would be experienced because of the variation in the distance the fingers would extend above the box ends. However, with the runners 166 mounted above the upper edges of the box edge as shown, the aforementioned inconvenience is avoided. When the bottom is nailed, the springs 161 yield to permit the runners 166 to be depressed to the level of the box ends. When the last side has been nailed, there is usually a slight shifting of the box ends in the clamping heads and it is to avoid damage to either the fingers 167 or the bottom boards that the springs 168 are provided to permit end movement of the runners 166.

In the shooks provided for making boxes in the machine described, the bottom boards are sometimes furnished already stitched or stapled together on cleats and sometimes they are furnished separated, and the cleats and two bottom pieces have to be placed in proper nailing position by the operator against stop gages in the nailing machine. Obviously, where the bottoms come already stitched or stapled together to cleats, they are simply placed on the form and nailed to the box ends. Under these conditions, of course, only one set of fingers 167 on the bottom guide runners 166 are employed.

When the bottom boards are supplied separately, they are positioned against the ends in the manner previously described and then the bottom cleats are attached by inserting them in special clamps on the nailing chucks so that they are properly aligned and nailed in place when the chucks and drivers are lowered. The mode of clamping the bottom cleats to the lower ends of the nail chucks preparatory to nailing the bottom of a box is illustrated in Figs. 24, 25 and 26. It will be observed that two outside dogs 204 are hingedly secured to the chuck bodies 215 by hinge pins 205 and are normally urged to the left (with reference to Fig. 24) by springs 211 mounted between the heads of bolts 210 passing through clearance holes in the dogs 204 and screwed into the chuck bodies 215. Set screws 212 are provided in the lower ends of the dogs 204 so as to position the faces 204a flush with the ends of the bottom boards, as shown in Fig. 25. These two dogs 204 are attached to chucks which are located each near the end of the row of chucks on each end of the machine. Cooperating with the two outside dogs 204 is an inside dog 208, which is pivotally secured by a pin 206 to a clamp 214, which is in turn secured to the chuck body 215 by a screw 213. The dog 208 is forced outward against a cleat 203 by a torque spring 209 and when no cleat is in position the dog 208 stops against the adjustable set screw 207 which is threaded in the clamp 214. The lower end of the dog 208 is so shaped and the dog is hung at such an angle that when the first and last sides are nailed the dog is lifted and no conflict is experienced, and at the same time the operator can quickly and easily insert a cleat between the dogs by a slight upward pressure.

The machine as described is designed particularly for the assembling of apple boxes, which have heads 10½″ x 11½″ x ½″ thick; sides 10½″ x 19⅜″ x ⁵⁄₁₆″ thick; two bottom boards, each 5¼″ x 19⅜″ x ¼″ thick with a cleat at each end ⅜″ x ½″ x 11½″. The two bottom boards are spaced about ½″ apart. The machine can also be adapted for making pear boxes, which are of the same dimensions as apple boxes except that the heads are 8½″ x 11½″, making the box 2″ shallower. This adaptation is made by inserting 2″ filler strips 54 (Figs. 31 and 32) in the clamping heads to bring the box heads to the proper nailing elevation when in position to receive the bottom boards.

*Operation*

The apparatus described is operated as follows: In its initial position of rest the various parts of the machine occupy the position shown in Figs. 4, 5, 8, 10, 11, 24 and 28. Thus referring to Fig. 4, the nailing head 15 is in uppermost position and the box form has been rotated into the position shown in Fig. 10 by spring 72 (Fig. 4), in which position it has been stopped by the roller 74 entering the slot 76 in the clamping head. Likewise referring to Fig. 5 the nail chuck frame 16 has been elevated to uppermost position by the cams 24 and connecting rods 21 and the projections 65 have engaged the radius arms 61 to lift the box form clear of the nailing anvils. The box end clamps 59 (Fig. 8) are opened since the latch 149 (Fig. 30) was tripped by the member 139 as the form moved into its position of rest, leaving the arm 146 lying against the outer latch surface 144 as shown in Fig. 28. The cam frame 107 is in right hand position, with the stop 108 against the surface 109b, as shown in Fig. 11, under which conditions the anvils 56 and 56a are supported in highest position, as shown in Fig. 10. Likewise the gage 177 is in lowered position adjacent the clamping head 53b, as shown in Fig. 10.

With the machine in the condition described, the operator picks up a pair of box ends and inserts them into the open clamps into the position shown in Figs. 8 and 10. The spring 161 exerts sufficient tension on the rear ends of the clamping members 59 to hold the ends against the aligning surfaces X and Y (Fig. 1) and the ends are supported vertically by the anvil surfaces $a$ and $c$ upon which they rest. The operator then lays a side shook on top of the ends, aligning this shook by moving it against the end guide 177 and against the guide fingers 202 (Fig. 27) rigidly attached to the clamping head. The operator then depresses the foot lever, which engages the clutch to automatically rotate the crank shaft 25 through one complete revolution, after which it is automatically stopped, as previously described. Rotation of the crank shaft 25 reciprocates the driver head 15 and simultaneous rotation of the cam 24 reciprocates the nail chucks down against the box side and back up again, nailing the first side to the box ends. The triangular disc 110 (Fig. 11) is simultaneously rotated through 120 degrees in a clockwise direction, causing the roller 111b to shift the lever 113 and actuate the end clamping mechanism, thereby shifting the end clamps 59 from the position shown in Fig. 8 into the clamping position shown in Fig. 7, thereby clamping the ends and maintaining them clamped until the box is finished.

Immediately after the ends have been clamped as described, the downward movement of the connecting rods 21 (Figs. 5 and 6) causes the projection 65 to release the radius arm 61, leaving the box form supported, through the clamped end boards, on the anvil surfaces $a$ and $c$. Hence, during the nailing operation, the entire thrust of the nailing mechanism is taken on the anvils 56 and 56a.

When the nailing head 15 was in lowermost position the tube 76 within spring 72 (Fig. 3) contacted against the end plugs in the spring to rotate the gear segments 69 and 66 into the position shown in Fig. 3, in which position the pawl 68 is engaged with one of the teeth of the ratchet wheel 67. On subsequent upward movement of the driver head 15, the spring 72 was tensioned to exert a torque on the shaft 55, tending to rotate the box form. The latter, however, was prevented from rotating by the roller 74 in engagement with the slot 76 in the clamping head. In the meantime the continuing rotation of the triangular disc 110 causes the roller 111a to engage the projection 108a and move the cam frame 107 into extreme left position, as shown in Figs. 12 and 13, in which the anvils 56 and 56a are shifted outwardly clear of the box form and the end guide 177 is elevated clear of the box form, as shown in Fig. 12. At the same time roller 74 is released from the clamping head 53b, permitting the spring 72 to rotate the form 90 degrees into the position shown in Figs. 14 and 15, in which position the back flat surface of the clamping heads are presented to the nailing mechanism for attaching the bottom boards. The final movement of the disc 110 rotates the roller 111a clear of the projection 108a, permitting the cam frame 107 to be retracted by the spring 122 into the position shown in Figs. 14 and 15 with the roller 74 engaging the slot 76a to properly index the clamping head (Fig. 20) and the anvil surfaces $b$ and $d$ are presented to the clamping heads. At this time the clamping heads are maintained clear of the anvil by the projections 65, which are again in uppermost position, as shown in Fig. 5.

Figure 18:
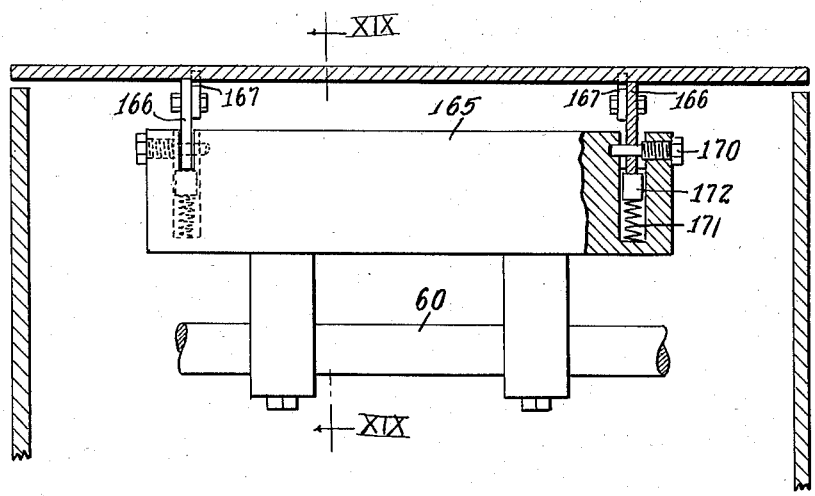
Fig. 18 is a front detail elevation of the form counterweight and shook stops and guides for supporting and aligning the bottom shook, the form being in position for nailing on the bottom shook.

With the machine stopped in the position described, the operator, who has reached for bottom boards and cleats while the aforementioned operations were taking place, now places the bottom boards on the form in the position shown in Figs. 14, 18 and 19 and places a pair of cleats against the nailing chucks, as shown in Figs. 24 and 26. Thereafter he again presses the foot pedal, causing the machine to go through its second cycle of operations, in which the clamping heads are lowered upon the anvil surfaces $b$ and $d$, the bottom boards nailed in position, the anvils and guide swung out of the way, the form rotated into its third position for attachment of the last side, and the anvils and guide again restored into normal position, as shown in Figs. 16 and 17. In the meantime the operator has picked up the last side shook and as soon as the machine comes to rest he places it in position, as shown in Fig. 16, and again depresses the foot pedal, whereupon the last side is nailed into position and thereafter the form rotated through 180 degrees into its starting position in which the clamps are released from the end boards so that the operator can pull the completed box off the form and insert the ends and first side of the next box.

Having fully described the preferred embodiment of this invention, it is to be understood that I do not limit myself to the exact construction herein set forth, which may obviously be varied in detail without departing from the spirit of this invention, but only as set forth in the appended claims.

I claim:

1. In a machine for assembling boxes, a rotatable form comprising a pair of clamping members for supporting a box end, means for moving said clamping members into gripping engagement with a box end inserted therebetween, spring means for successively rotating said form through successive arcs to present different edges of said box end in a predetermined nailing plane, means for securing box sides to successive edges of said box end while said edges are in said predetermined plane, and means for releasing said clamping members from gripping engagement with said box end following attachment of said last box side to said box end.

2. In a machine for assembling boxes, a rotatable form comprising a pair of clamping members for supporting a box end, spring means tending to open said members, and means including a lever projecting from said form for closing said members in response to movement of said lever, latch means on said form for locking said members in closed position, means for intermittently rotating said form into a plurality of positions for nailing different sides on a box end gripped in said clamping members, movable means on said machine separate from said rotatable form positioned to engage with and shift said projecting lever to close said members in one position of rest on said form, a nailing mechanism, driving means for actuating said movable means, said nailing mechanism and form rotating means in timed sequence, and latch tripping means external of said form but in the path of rotation of said latch on said form for engaging with and tripping said latch to release said clamping members when said form rotates into a predetermined position.

3. In a machine for assembling boxes, a rotatable form comprising a pair of clamping members for supporting a box end, spring means tending to open said members, and means including a lever projecting from said form for closing said members in response to movement of said lever, latch means on said form for locking said members in closed position, means for intermittently rotating said form into a plurality of positions for nailing different sides on a box end gripped in said clamping members, movable means on said machine separate from said rotatable form positioned to engage with and shift said projecting lever to close said members in one position of rest on said form, a nailing mechanism, driving means for actuating said movable means, said nailing mechanism and form rotating means in timed sequence, and latch tripping means external of said form but in the path of rotation of said latch on said form for engaging with and tripping said latch to release said clamping members when said form has completed a revolution and is again moving into its first position of rest, and means for releasing said tripping means from operative engagement with said latch before said form reaches its position of rest to permit subsequent relocking of said clamping members by said movable means while said form is still in its first position.

4. In a machine for assembling boxes, a rotatable form for supporting box parts in a plurality of positions, means for locking said form in one position, means movable toward and away from said form for securing other box parts to said first mentioned box parts while in said one position, spring means for rotating said form into a second position, means for distorting said spring means while said securing means is moving toward and from said form, whereby energy stored in said distorted spring means rotates said form into a second position following movement of said securing means away from said form.

5. In a machine for assembling boxes, a rotatable form for supporting box parts in a plurality of positions, means for locking said form in a plurality of positions, means movable toward and away from said form for securing other box parts to said first mentioned box parts while in said different positions, spring means for rotating said form from one position to a second position, means for distorting said spring means while said securing means is moving toward and from said form in each position to store energy in said spring while said form is in one position, means for releasing said locking means to permit said form to rotate into its next position following each reciprocation of said securing means, means for restoring said locking means to lock said form in its next position as it approaches that position under the power stored in said spring, and means for smoothly decelerating said rotating form as it approaches its next position to facilitate the operation of said locking means.

6. In a machine for assembling boxes, a rotatable form for supporting a pair of box ends in juxtaposed position, a nailing mechanism reciprocable in a fixed path toward and away from said form for nailing side and bottom members to said end members, means for successively reciprocating said nailing mechanism toward and away from said form to successively nail a side, a bottom and another side on said box ends, and a spring means timed with respect to said nailing mechanism for rotating said form through 90 degrees following said first and second reciprocations, respectively, and through 180 degrees following the third reciprocation of said nailing mechanism.

7. In a machine for assembling boxes, a form rotatable about an axis for supporting box parts in a plurality of positions of orientation about said axis, a nailing mechanism reciprocable toward and away from said form for nailing together box parts supported on said form, anvil means movably supported adjacent said form on the side thereof opposite said nailing mechanism, normally positioned to contact with box parts in said form during a nailing operation, spring means for rotating said form to present different sides of box parts thereon to said nailing mechanism, and means for shifting said anvil means out of the path of box parts on said form during rotation of the latter and restoring said anvil means into position against box parts on said form following rotation of said form into each of said plurality of positions.

8. In a machine for assembling boxes, a rotatable form including a pair of means for supporting a pair of box ends in spaced apart juxtaposed positions, and also including bottom board guide means comprising a pair of board supporting elements and means for yieldingly supporting said elements clear of the edges of the box ends, and a nailing mechanism reciprocable toward and away from said form for nailing the bottom boards to the box ends, said board supporting elements yielding in response to pressure from the nailing mechanism to permit the boards to contact the box ends.

9. A machine as described in claim 8, in which said bottom board supporting elements are provided with stop means for aligning said boards, said means comprising spaced members projecting above said elements a distance less than the thickness of the bottom boards to be used therewith.

10. In a box nailing machine, a rotatable box form having supporting shafts, radius arms for supporting said shafts for limited movement in a substantially vertical arc, a nailing mechanism supported for vertical movement above said form, laterally moving anvils for supporting box parts in said form when said form is in lower position, means for reciprocating said nailing mechanism down against and up away from said form, means for laterally shifting said anvils into position to support a box in said form as the nailing mechanism descends and back out of supporting position as the nailing mechanism ascends, means connected to said nailing mechanism and adapted to engage said radius arms for lowering said form toward said anvils as the nailing mechanism descends and lifting the form away from the anvils as the nailing mechanism ascends, and means for rotating said form on said shaft following upward movement of said nailing mechanism and lateral movement of said anvils.

11. In a box nailing mechanism, a rotatable box form, a nailing mechanism supported for vertical movement above said form, laterally movable anvils for supporting box forms in said form against the thrust of said nailing mechanism, means for reciprocating said nailing mechanism down against and up away from said form, means for laterally shifting said anvils clear of a box in said form and back into nailing position as said nailing mechanism ascends, spring means for rotating said form, and means comprising cooperating members on one of said anvils and on said form, respectively, for locking said form against rotation while said anvils are positioned to support said box in nailing position and for releasing said box to permit it to be rotated by said spring means into next position while said anvils are moved laterally to clear a box in said rotating form.

12. In a box making machine, a rotatable box supporting form, anvils vertically and laterally adjustable to engage with and support a box in said form in a plurality of positions, a reciprocable nailing mechanism, means for reciprocating said nailing mechanism and applying torque to rotate said form in timed relation, a cam plate having a plurality of cam surfaces and means for shifting said cam plate in timed relation to said nailing mechanism, and means actuated by said cam surfaces on said plate for shifting said anvils and releasing and locking said form.

13. A machine as described in claim 12, in which the means for shifting said cam plate includes means for shifting the cam plate into one end position and releasing it once during each movement of the nailing mechanism, spring means for retracting said cam plate toward its opposite end position, and variable stop means for differently limiting return movement of said cam plate in different positions of orientation of said box supporting form, whereby anvil positioning cam surfaces on said plate of different heights are juxtaposed to anvil cam followers in different positions of orientation of said form.

14. In a box assembling machine, a rotatable form, releasable locking means for engaging with and stopping said form in predetermined positions of orientation, spring means for rotating said form from one position to the next following release of the form by said locking means, and means for decelerating said form as it approaches its next position of rest comprising a cam on said form, a cam follower for engaging said cam and dash pot means connected to said cam follower.

15. In a box nailing machine, a nailing mechanism reciprocable toward and away from box parts to be nailed, comprising a plurality of aligned nail chucks and means for supporting a cleat against said nail chucks, comprising a pair of spring cleat engaging dogs secured to a pair of remotely positioned chucks, on one side of the nailing line of said chucks, said first pair of dogs having cleat engaging surfaces extending beyond a cleat engaged thereby to contact with the end surface of a box to be nailed for aligning the outer edge of the cleat with the box end and in which the third dog is pivotally mounted to swing inwardly and upwardly and is extended beyond the cleat engaged thereby, whereby it contacts with and is swung inwardly and upwardly by the top board of the box being nailed, thereby releasing the cleat.

HERBERT E. TWOMLEY.